Jan. 9, 1940.                 C. W. NORTON                    2,186,265
                          CALCULATING MACHINE
                          Filed June 29, 1935            6 Sheets-Sheet 1

INVENTOR
Charles W. Norton
By Ramsey Kent Chadwick & Lutz
ATTORNEYS

Jan. 9, 1940.  C. W. NORTON  2,186,265
CALCULATING MACHINE
Filed June 29, 1935   6 Sheets-Sheet 2

INVENTOR
Charles W. Norton
BY
Ramsey, Kent, Chisholm & Lutz
ATTORNEYS

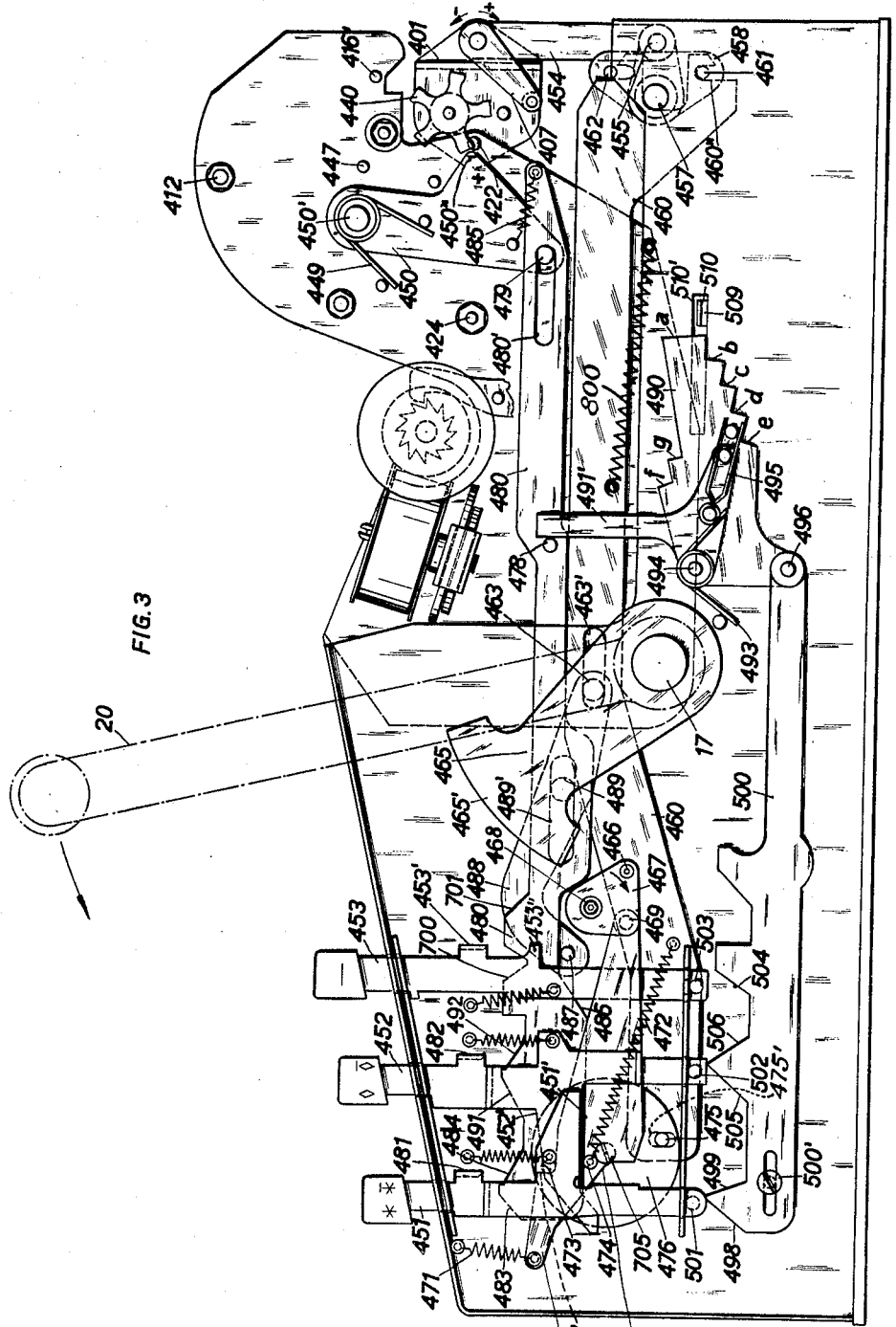

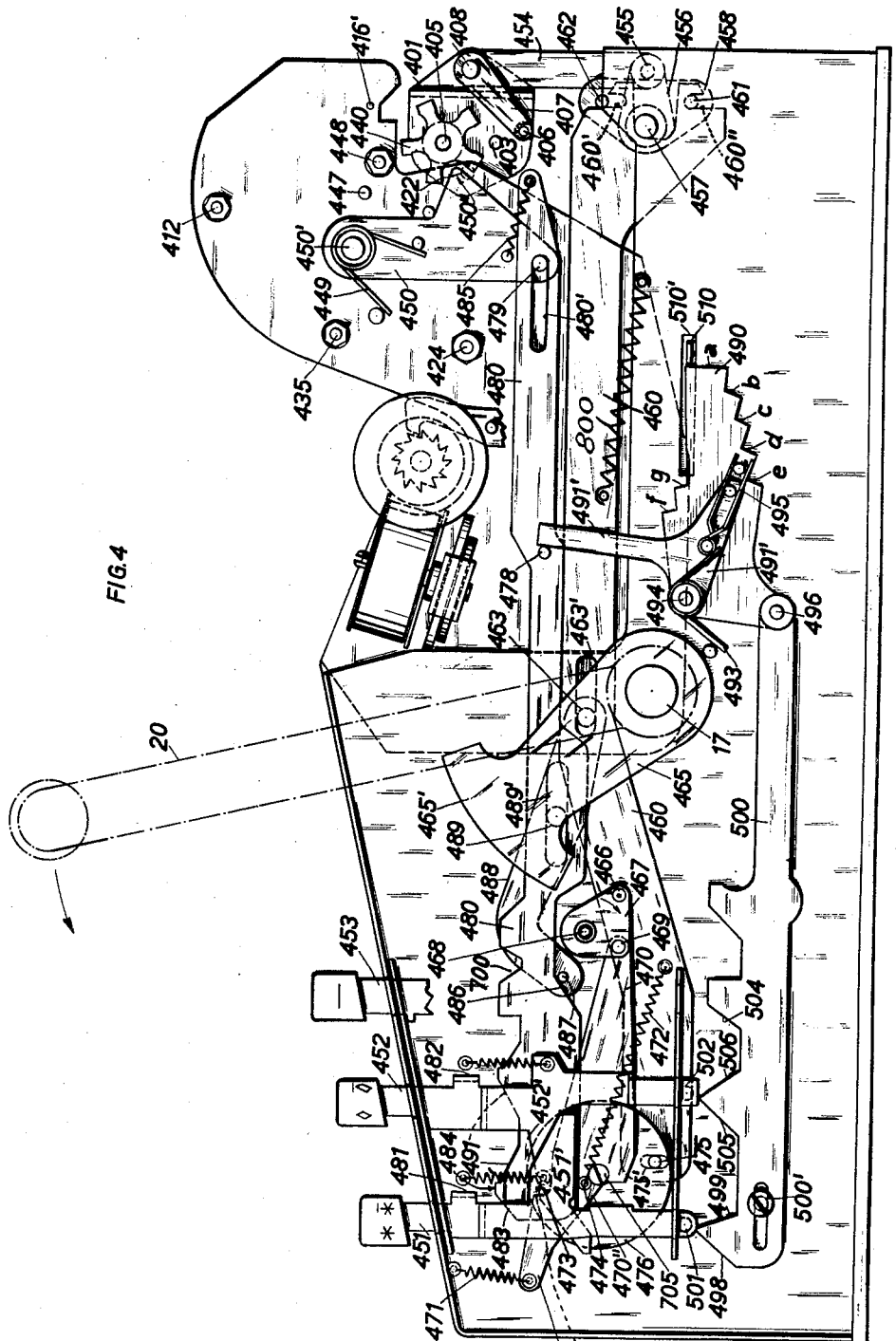

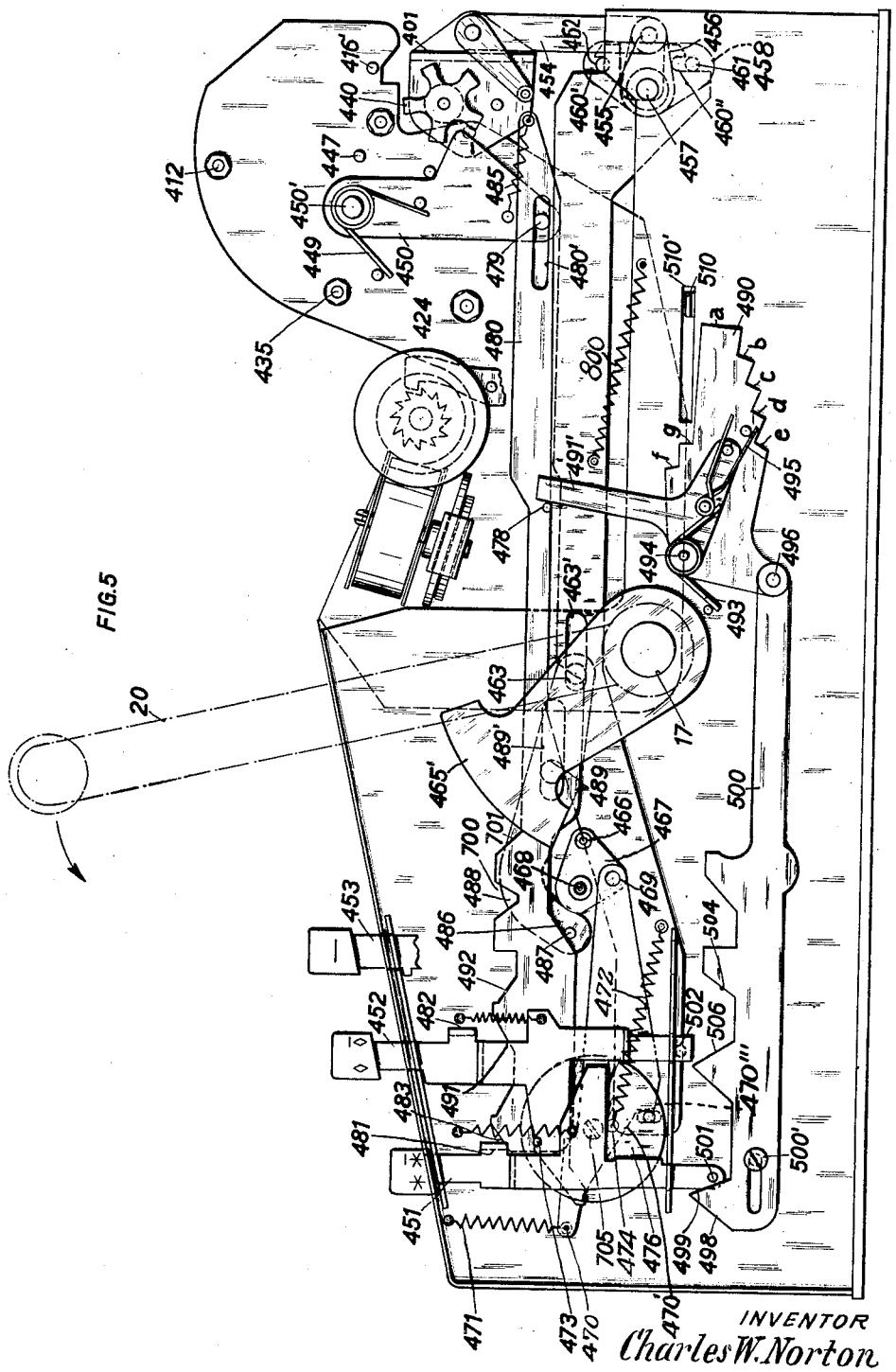

Jan. 9, 1940.　　　　C. W. NORTON　　　　2,186,265
CALCULATING MACHINE
Filed June 29, 1935　　　　6 Sheets-Sheet 6

INVENTOR
Charles W. Norton
By Ramsey Kent Chisholm & Lutz
ATTORNEYS

Patented Jan. 9, 1940

2,186,265

UNITED STATES PATENT OFFICE 2,186,265

CALCULATING MACHINE

Charles W. Norton, West Orange, N. J., assignor to Brunsviga Maschinenwerke Grimme Natalis & Co. A. G., Brunswick, Germany Application June 29, 1935, Serial No. 29,007

5 Claims. (Cl. 235—60)

My invention relates to improvements in calculating machines and more particularly in machines which are adapted to take the balance of amounts, and which are provided with an adding mechanism comprising a set of adding wheels and a set of subtraction wheels adapted to be selectively thrown into position for cooperation with toothed segments. My machine is provided with carrying mechanism which is adapted (when a carrying operation is performed during subtraction) to transfer a carry in the highest order register wheel to the lowest order register wheels.

The object of the improvements is to provide a machine in which the said mechanism for transferring the unit from the wheels of the highest order to the wheels of the lowest order is adapted to set the adding mechanism into the correct position either for taking a positive or negative sub-total or total. With this object in view my invention consists in providing a controlling wheel formed with five teeth and cooperating with the said transferring mechanism and the adding mechanism in such a way that the said controlling wheel is rotated in positive or negative direction through an angle corresponding to one half of the distance between two consecutive teeth whenever a continuous carrying operation has been performed up to the highest order, the said controlling wheel cooperating, either with one of its teeth or with a space between consecutive teeth, with the mechanism for setting the adding mechanism into position.

A controlling wheel of this construction may be readily manufactured and mounted in the machine, and by reason of its symmetrical shape it is reliable in operation.

For the purpose of explaining the invention an example embodying the same has been shown in the accompanying drawings in which the same reference characters have been used in all the views to indicate corresponding parts. In said drawings, Fig. 1 is a longitudinal sectional elevation of the machine showing the parts in initial position.

Fig. 3 is an elevation of the machine viewed from the right, the side wall of the machine being removed and all the parts being in their initial positions and the controlling wheel being in the plus position in which it is adapted to set the adding mechanism into position for making additions.

Fig. 4 is a similar elevation showing the controlling wheel in the position for setting the adding mechanism into the position for making subtractions, some of the parts being removed.

Fig. 5 is an elevation similar to the one illustrated in Fig. 4 showing the controlling wheel in the same position and the total key depressed.

Figure 1:
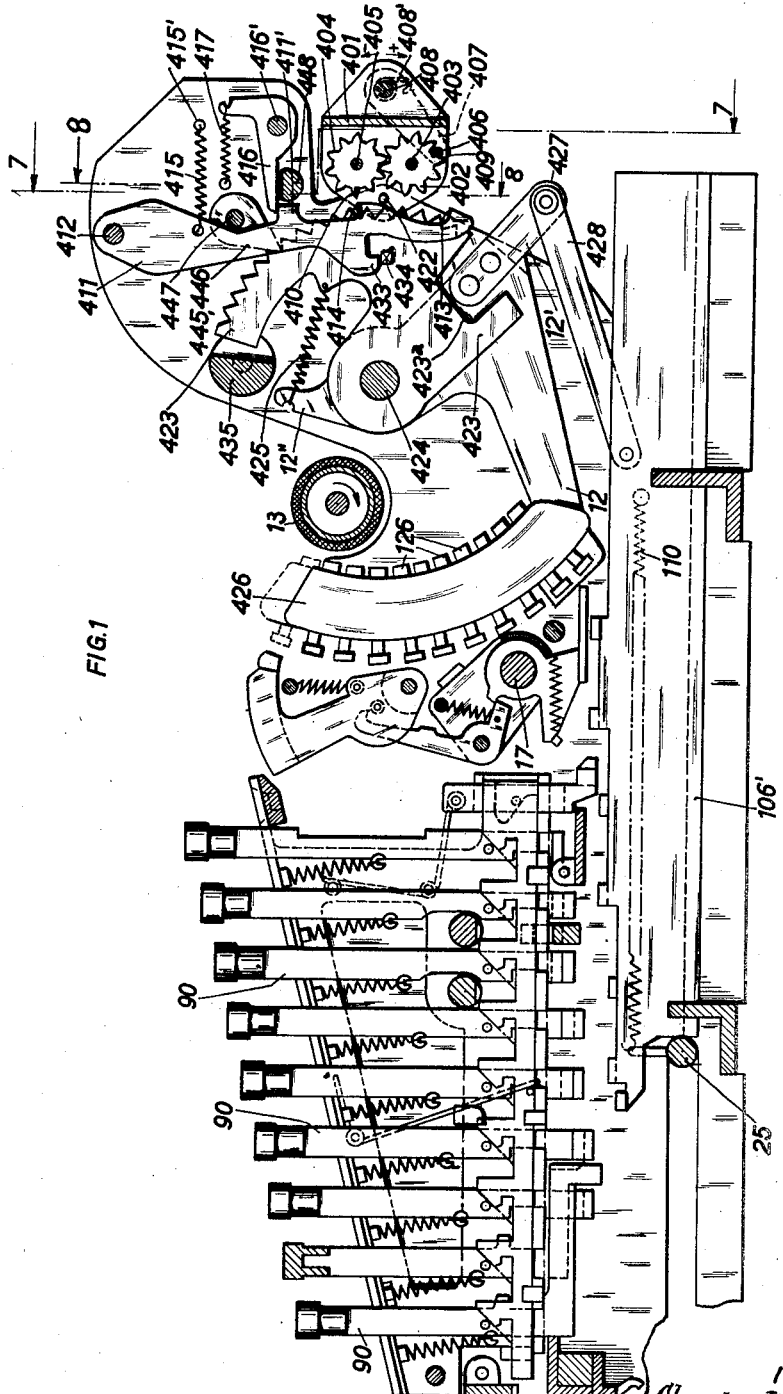

The machine described herein is somewhat similar in construction to the machine described in the patent of the United States to Coxhead and Norton, No. 1,986,137, dated January 1, 1935, and it comprises numeral keys 90 arranged in several columns one beside the other and cooperating with slides 106' connected with an adding mechanism comprising toothed segments 423 and printing mechanism comprising segmental type holders 426, a platen 13, printing hammers 18 and a main operating shaft 17. These parts and other parts associated therewith are similar in construction to the corresponding parts shown in the said patent and my invention does not relate to these parts. Therefore I deem it not necessary to describe the same more in detail.

The printing mechanism comprises type holders 12 mounted one beside the other on a shaft 424 located transversely of the machine, and they are held at their proper distances apart by spacing discs (not shown). Each type holder 12 carries a segment 426 on which the types are mounted, and each holder 12 has an arm 427 fixed thereto which is connected by a link 428 with one of the slides 106'. Toothed segments 423 are mounted on the shaft 424 alternately with the type holders 12, and are likewise located equal distances apart. These toothed segments 423 are yieldingly connected by springs 425 with the type holders 12; the said springs being attached with one of their ends to the toothed segments 423 and with their opposite ends to heels 12" made integral with the type holders 12.

The arms 427 are located in cut-out portions 423a of the toothed segments 423, so that they are adapted to be moved relatively to the segments 423 in opposition to the springs 425 a distance corresponding to the distance between two consecutive teeth.

The register mechanism is mounted in a cradle 401 which is pivotally mounted on the main frame of the machine by means of pivot bolts 422. It comprises two sets of meshing register wheels 402 and 404 each formed with ten teeth; there being one gear wheel for each denominational order of the machine. The register wheels 402 are located below the register wheels 404 on an axis 403, and the upper register wheels 404 are mounted on an axis 405. The register wheels 402 are the addition register wheels and the register wheels 404 the subtraction register wheels. The said register wheels are yieldingly locked in their respective positions by means of a rod 406 engaging the lower set of register wheels 402, the said rod being carried by arms 407 which are pivotally mounted on an axis 408 disposed in the housing 401, and a spring 408' being attached to the axis 408 for holding the rod 406 in engagement with the spaces between the teeth of the gear wheels 402. Thereby the register wheels 402 as well as the register wheels 404 are held in their positions, and when the register wheels are rotated the rod 406 yields outwardly. The addition and subtraction register wheels 402 and 404 are each provided with a carrying nose 409 and 410 respectively (Figs. 1 and 7) which cooperate with carrying levers 411 all pivotally mounted on an axis 412 secured to the frame of the machine. The said levers are formed with noses 413 and 414 (Fig. 1); the noses 413 cooperating with the carrying noses 409 and the noses 414 with the carrying noses 410. Springs 415 are attached to the carrying levers 411 and are attached with their opposite ends to a rod 415' secured to the frame of the machine, the said springs tending to move the carrying levers towards the register wheels 402 and 404.

Subsidiary latches 416 are pivotally mounted on a rod 416' in the planes of the carrying levers 411, the said latches normally resting the horizontal portions of their arms on noses 411' projecting from the carrying levers 411 and having springs 417 attached to their upwardly directed arms. A segmental shaft 448 is mounted on the side walls of the machine below the said horizontal arms of the subsidiary latches.

Figure 2:
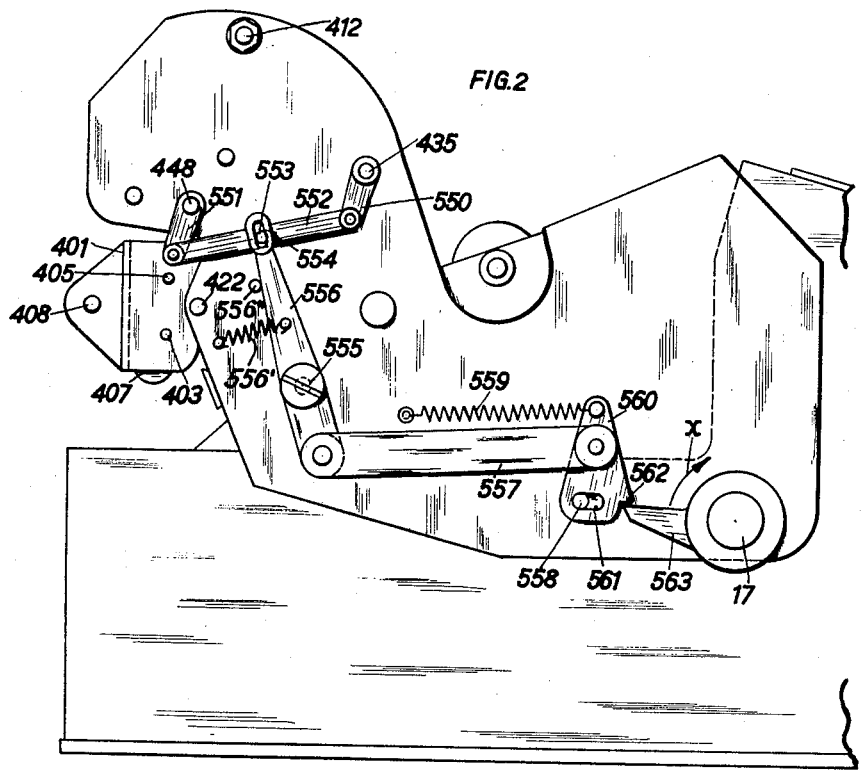
Fig. 2 is an elevation showing a part of the machine relating to resetting the carrying mechanism.

The rear sides of the levers 411 are formed with arms 433 which bear on pins 434 fixed one to each toothed segment 423 and having square cross-sections. The said arms 433 and pins 434 prevent upward movement of the toothed segments by the springs 425. A segmental shaft 435, which is mounted for oscillation on the main frame, is located adjacent the upper ends of toothed segments 423 (Fig. 1). The shafts 435 and 448 project outwardly from the left hand side wall of the machine and at their left hand ends they carry cranks 550 and 551 respectively which are connected with each other by a link 552 (Fig. 2). A pin 553 carried by the link 552 engages in a longitudinal slot 554 of a lever 556 which is mounted on a pivot bolt 555 secured to the side wall of the machine (Fig. 2). The downwardly directed end of the lever 556 is connected by a link 557 with a latch 560 which is mounted with a slot 561 on a pivot bolt 558 and which is acted upon by a spring 559 to normally set the pin 558 in the rear end of the slot 561. A shoulder 562 formed on the latch 560 is normally positioned over an arm 563 secured to the main shaft 17. This arm 563 is formed with a bevelled end in order to cam the latch 560 rearwardly on the return stroke of the main shaft 17.

Figure 7:
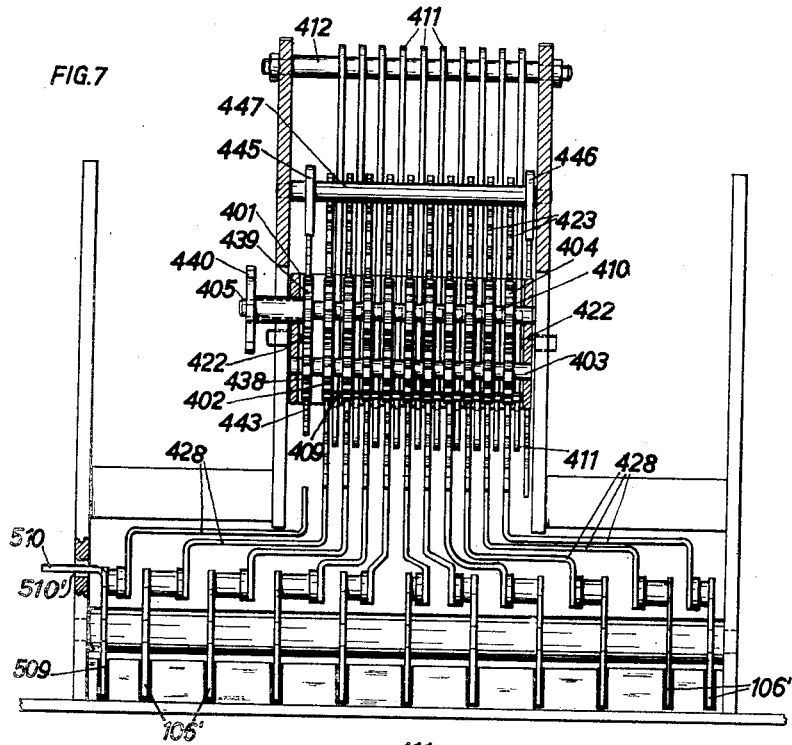
Fig. 7 is a sectional elevation of the adding mechanism taken on the line 7—7 of Fig. 1.
Figures 8, 9:
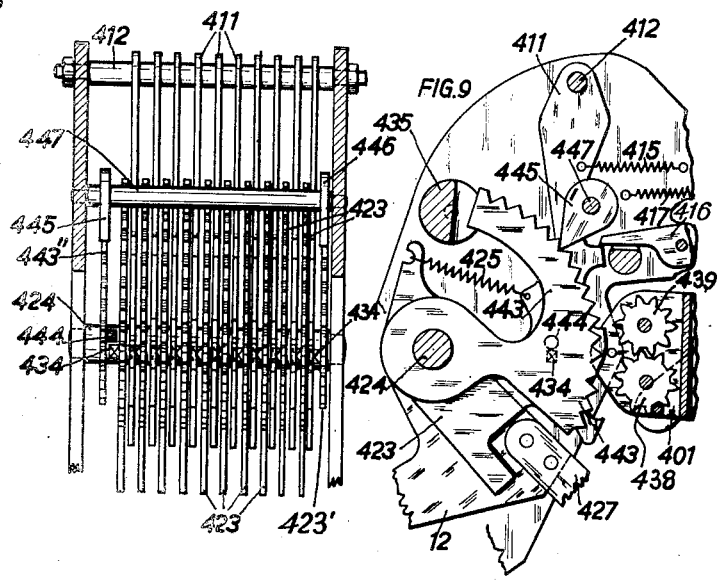
Fig. 8 is a sectional elevation taken on the line 8—8 of Fig. 1, some of the parts of the mechanism and the casing being removed.
Fig. 9 is an elevation showing details of the adding mechanism.

At the side of the unit register wheel of the addition register wheels 402 a similar gear wheel 438 is mounted on the axis 403, and at the side of the unit register wheel of the subtraction register wheels 404 a subsidiary gear wheel 439 is mounted on the axis 405 (Figs. 7 and 9).

The gear wheel 439 meshes with the subsidiary wheel 438. The said subsidiary gear wheels 438 and 439 have no carrying noses formed thereon (Fig. 7). An elongated hub of the subsidiary gear wheel 439 carries a controlling wheel 440 which is formed with five teeth (Figs. 3, 4, and 5).

The subsidiary gear wheels 438 and 439 are adapted to cooperate with a subsidiary toothed segment 443" which is pivotally mounted on the axis 424, and which is similar in construction to the toothed segments 423. But the said subsidiary toothed segment is not connected with a slide 106' or a type segment 12. Further, the said subsidiary segment 443" is not provided with a square pin 434, but at its inner side opposite pin 434 on the adjacent segment 423 it carries a round pin 444 (Fig. 8) which is engaged by the pin 434 of the toothed segment 423 of the first denominational order of the register mechanism.

Above the toothed segments 423 and between the side walls of the adding machine, there is mounted a shaft 447 which carries two teeth 445 and 446 engaging respectively in the teeth of the subsidiary segment 443" and the segment 423 of the highest denominational order of the register wheel actuating segments (Fig. 8).

The control wheel 440 is located outside and to the right of the registering mechanism and in the plane of a controlling lever 450 pivotally mounted on a bolt 450' and acted upon by a spring 449 (Fig. 3). The said controlling lever 450 is formed with a nose 450" which is pressed into engagement with the controlling wheel 440 by the spring 449, the said nose engaging either a tooth or a space of the said controlling wheel dependent upon the rotative position of the controlling wheel 440. In the position of the parts shown in Fig. 3 the controlling lever 450 bears on a tooth of the wheel 440 which indicates that a positive or plus condition exists in the registering device. In case of a negative value or minus condition in the register mechanism, the nose 450" engages in a space of the said wheel 440. Hereinafter the said positions of the controlling wheel and the controlling lever will be described as plus and minus positions. Near its bottom end the controlling lever 450 is formed with a laterally projecting pin 479 which engages in a longitudinal slot 480' of a controlling slide 480, and between the lever 450 and the slide 480 there is a spring 485 tending to hold the pin 479 in engagement with the right hand end of the slot 480'. The controlling slide 480 is guided on a pin 489 secured to the outside of right hand side wall of the machine, the said pin engaging in a longitudinal slot 489' of the slide 480. At its free end the controlling slide is formed along its upper margin with inclined cam faces 483, 484, 492, V-shaped notch 700 and a cam face 701 (Fig. 3). At its bottom part the slide is formed with a cam face 486 which is located in the path of a pin 487 carried at one end of a lever 488 which is pivotally mounted on the machine frame on the pin 489. At its opposite end the said lever 488 carries a pin 463 which engages in a longitudinal slot 463' of a slide 460. At its front end the said slide 460 is formed with a vertical slot 475' which is engaged by a pin 475 on a disc 476 rotatably mounted on a pivot bolt 705 secured to the side wall of the machine. Substantially diametrically opposite to the pin 475 the said disc 476 carries a second pin 473.

At its other end the slide 460 is formed with two slots 460' and 460", the slot 460' being open upwardly and the slot 460" downwardly (Fig. 4). The said slots are adapted to be alternately engaged by pins 461 and 462 of an eccentric plate 458 secured to a shaft 457. A crank arm 456 is secured to the shaft 457 and is connected by a pin 455 with a link 454 and the crank arm 456 takes part in the movement of the shaft 457. At its opposite end the link 454 is joined to the rod 408 of the housing 401 of the registering mechanism.

A bell crank lever 491' is mounted at the right hand side wall of the machine on a pivot bolt 494. The upwardly directed arm of the bell crank lever 491' is pressed forwardly by a spring 493 and bears on a pin 478 fixed to the side of the controlling slide 480 (Fig. 4). An arm 490 is also mounted on the pivot bolt 494 and is normally held in elevated position by means of a bifurcated spring 495 secured to the bell crank lever 491'. The arm 490 is formed with stepped shoulders a, b, c, d, e, f and g, and a downwardly directed portion thereof is connected by a pivot bolt 496 with one end of a setting rail 500. This setting rail is guided, by means of a longitudinal slot, on a pin 500' fixed to the side wall of the machine. At its top side the rail 500 (Fig. 3) is formed with bevelled cam faces 498, 499, 505, 506 and 504 cooperating with pins 501, 502 and 503 carried by the stems of printing controlling keys 451, 452 and 453 which are vertically movable at the right hand side of the machine, said keys and their relation to other parts being shown in detail and explained in Coxhead et al. No. 1,986,137, above referred to. The pin 501 is fixed to the bottom end of the stem of the total key 451 and it is adapted to cooperate selectively with the cam faces 498 and 499. Pins 502 and 503 (Fig. 3) are secured respectively to the bottom end of the stem of the sub-total key 452 and the subtraction key 453 and these pins cooperate with the other cam faces of the setting rail 500. The stems of the printing controlling keys 451, 452, and 453 are passed outwardly through the lid covering the key mechanism. When the keys 451, 452 are depressed lateral projections 481 and 482 of the stems thereof cooperate selectively with the cam faces 483 and 491 or 484 and 492 of the controlling rail 480.

A lever 465 is keyed to the main shaft 17 at the right hand side of the machine. This lever is formed with a head 465' having a shape similar to a hammer. A lever 467 is mounted on a pivot bolt 468 fixed to the machine casing, and this lever carries a roller 466 located in the path of the head 465'. A coupling member 470 is connected by a pivot bolt 469 to the said lever 467, and is suspended at its free end from the machine casing by a spring 471 tending to move the coupling member 470 upwardly. A second spring 472 is attached at one end to a pin 474 fixed to the said member 470 and at the other end to a pin 472a (Fig. 6) secured to the inner side of the right-hand wall of the machine, and this spring 472 tends to pull the member 470 to the right in Figs. 3 and 6. The top part of the member 470 is formed with a shoulder 470'. In the position shown in Fig. 3 the springs 471 and 472 hold the member 470 with its shoulder 470' in engagement with the aforesaid pin 473 carried by the disc 476; the spring 471 pulling the said member upwardly and the spring 472 pulling the same rearwardly. The member 470 at its bottom side is formed with an angular cut-out portion 470" providing a shoulder with a cam face 470''' adjacent thereto. In the right hand side wall of the machine there is a horizontal longitudinal slot 510' through which a nose 510 of a slide 509 projects outwardly (Figs. 3 and 7). The said nose is adapted to engage any one of the steps a to g of the lever 490. The operating mechanism of the slide 509 has a construction similar to that of the slides 106'.

The slides 509 and 106' are adapted to be shifted in longitudinal direction by means of a rod 25 (Figs. 1 and 6), and the said rod is operated from the main driving shaft 17 through the intermediary of the said lever 465, a lever 720 and a link 721. The lever 720 is mounted on a pivot bolt 725 and has a pin and slot connection 726—727 with the link 721, and the said lever and link are connected with each other by a spring 728. The lever 465 carries a pin 722 which is passed into the inner part of the machine through an arcuate slot 723 made in the side wall of the machine, and this pin engages in a longitudinal slot 724 made in the lever 720. At its free end the link 721 is joined to the rod 25.

The stems of the keys 451 and 452 are provided with integral arms 451' and 452' respectively which are located in the path of the pin 474 of the coupling member 470.

The operation of the mechanism is as follows:

The parts may be in the positive positions shown in Fig. 3, and it may be assumed that the desired number has been set up on the keyboard by means of the proper keys 90. Now rotary movement is imparted to the main driving shaft 17 by pulling the driving lever 20 forwardly. Thus the rod 25 is shifted forwardly by means of the lever 465, the pin 722 thereof, the lever 720 and the link 721. Thereby the slides 106' are moved forwardly by means of springs 110 acting thereon, until they are arrested by the depressed keys. Thus the said slides are moved through different distances according to the values represented by the keys. The type holders 12 and the toothed segments 423 by the said movement of the slides 106' are turned through angles corresponding to the movements of the slides 106' through the intermediary of the links 428 and the arms 427. When the hand crank 20 is rocked forwardly, the hammer shaped head 465' of the rockable lever 465 engages the roller 466, thereby rocking the lever 467 and the coupling lever 470 is moved to the left in Fig. 3, thus tensioning spring 472. This movement causes the coupling lever 470 to slide with its upper edge under the pin 473 of the disc 476 until the hammer shaped head 465' has passed the roller 466. The spring 472 retracts the coupling lever 470 and brings its shoulder 470' into engagement with pin 473. As the hand crank 20 is again returned to initial position, the hammer head 465 engages the roller 466 and rocks the lever 467 anti-clockwise, whereby the coupling lever 470 is pulled to the right. During this movement, the shoulder 470' of the coupling lever 470 being in engagement with the pin 473 turns the disc 476 clockwise and the rail 460 is pulled to the left by the pin 475 on the disc 476. The rail 460 is subject to the action of spring 800 which spring is extended upon motion of the rail to the left, and upon movement of the rail to the left (Fig. 4) the totalizer is brought into engagement with the racks 423. The rail 460 is drawn back to the right by contraction of spring 800 after rock arm 465 has passed upward beyond pin 466, and thus the totalizer is separated from said racks and returned to its starting position. In the plus position shown in Fig. 3, the downwardly open slot 460'' of the rail 460 engages the pin 461 of the rocker 458, so that upon forward movement of the rail 460, the frame 401 for the register wheels is rocked downwardly by means of the link 454, and the register wheels 402 are brought into engagement with the toothed segments 423. The number thus set up by means of the keys 90 is transmitted to the register mechanism, as is known in the art. If one of the register wheels 402 passes from 9 to 0 a carrying operation is caused by the carrying nose 409 of the said register wheel engaging the nose 413 of the cooperating carrying lever 411, the said carrying lever being turned to the left in Fig. 1 in opposition to the spring 415. Thereby the nose 433 of the said carrying lever releases the lug 434 of the toothed segment of the next higher order, and the said toothed segment is moved upwardly by means of the springs 425 a distance corresponding to the distance between two consecutive teeth, until it is arrested by the segmental shaft 435. The carrying lever 411 is held in rocked position by the subsidiary latch 416 which has dropped in front of the nose 411' of the carrying lever 411 and rests in position on the shaft 448. The toothed segment 423 carries along the cooperating register wheel 402 of the next higher order through a distance corresponding to one value.

The registers are so arranged that when the adding wheels 402 all stand at zero, all of the subtracting register wheels 404 stand at nine, and if the subtracting register wheels 404 stand at zero, then all of the adding register wheels 402 stand at nine. Since these registers are directly geared together, a forward rotative movement imparted to one set of register wheels by the segmental racks 423, will impart a backward rotative movement to the wheels of the other register and vice versa.

During subtracting operations, the result is one less in units column than the correct amount should be, if one of the register wheels passes through zero. This happens each time a larger amount is subtracted from a smaller amount so that the result is a negative number. In order to obtain the correct result under these conditions, it becomes necessary to introduce the amount of one unit in the units column register wheel. In the present machine this is accomplished by causing a carrying operation to pass through the register up to and including the highest order tooth segment 423' (Fig. 8). This carrying movement of the highest order segmental rack 423' is brought back to cause a single tooth movement in units order segmental rack and thereby impart the necessary additional unit movement to the unit register wheel. This extra tooth movement to units segmental rack is accomplished in the following manner. The carrying movement in the highest order segmental rack 423' causes a rotative movement to the single tooth member 446, thereby rotating the shaft 447 and the complemental single tooth member 445. The single tooth member 445 imparts a one tooth movement to the segment 443 (Fig. 9) and causes a round pin 444 to be moved upwardly so that the square pin 434 of the toothed segment of the first order is released and the spring 425 pulls this unit segment rack 423 of the first order upwardly through the distance corresponding to one unit value, thereby rotating the unit register wheel one tooth and setting up in the register the correct complemental value for the negative number. This operation is designated as introducing a "fugitive unit" from the highest order to the lowest order. It is to be understood that the highest order segmental rack 423 is not operated from the keyboard and does not connect with any register wheel. The movement of the subsidiary segment 443 and the subsidiary wheel 438 and its corresponding wheel 439 have moved in such manner as to rotate the controlling wheel 440, which is connected with the subsidiary gear wheel 439. This movement is an amount corresponding to one half the distance between two consecutive teeth on the control wheel 440. When this occurs, the nose 450'' of the controlling lever 450 is opposite a space between two consecutive teeth of the controlling gear wheel 440 and upon the operation of the machine, this lever drops into the said space as is shown in Figs. 4 and 5. The position of this control wheel 440 controls the operation of the mechanism as will be hereinafter more fully explained.

The machine has nine rows of denominational keys and nine slide bars therefor, i. e.; it is what is known in the art as an eighty-one key machine, while the register is provided with ten wheels, there being a tenth slide 106' and a tenth segment 423' for the tenth wheel, but no corresponding row of keys, so that a carry can take place from the ninth wheel to said tenth wheel and the tenth numeral will be printed. But if an adding operation is continued to a point where a carry from such tenth order is called for the carry of the "fugitive unit" will go back into the lowest order and thus an erroneous result will be produced due to addition in excess of the capacity of the machine. To notify the operator of the existence of such erroneous result provision is made to print a negative sign, which indicates a negative result such as is impossible and incorrect in positive addition.

Thus upon each carrying operation which continues up through the highest order the "fugitive unit" is transmitted to the units wheel either in the positive sense, or when the subtraction wheels 404 are in mesh with the toothed segments, in the negative sense, and further the controlling wheel 440 which has five teeth is turned through one half the distance between two consecutive teeth, that is through an angle of 36°, the direction of the rotation of the said wheel being different in case of additions and subtractions.

The correct movement of the adding mechanism into operative position for performing an addition or a subtraction depends on the position of the controlling wheel 440.

The toothed segments 423, the carrying levers 411 and the subsidiary latches 416 are returned into their initial positions shown in Figs. 1 and 3 at the beginning of the next operation of the machine by means of the hand-operated crank 20 through the intermediary of the mechanism shown in Fig. 2.

A spring 556' which is stronger than the spring 559 normally holds the upper end of lever 556 in engagement with the stop 556''. The mechanism just referred to is a resetting mechanism by means of which the transfer devices of the machine are reset at the very beginning of the forward power stroke. As the main shaft 17 turns clockwise in the direction of the arrow X (Fig. 2), the arm 563 engages beneath the shoulder 562 of the lever 560, and rocks this lever on the pin 558 as a pivot. The rocking of lever 560 by the finger 563 produces a thrust on the link 557 which rocks the lever 556 in a clockwise direction, and this lever through pin 553 connecting bar 552 and crank arms 550 and 551 rock the resetting segmental shafts 435 and 448 in a counter-clockwise direction. The rocking of the shaft 435 resets the toothed segments 423 and the rocking of shaft 448 lifts the latches 416 to permit the springs 415 to swing the transfer levers 411 toward the rear of the machine and replace the stops 433 of the transfer levers, over the square pins 434 on the segments 423, thereby resetting the transfer mechanism in position to be operative to effect a carry when required in the further operation of the machine.

By this mechanism and the operation thereof at the beginning of each calculating operation, the result is attained that the carrying operation is performed in each calculation without lost motion, and that it does not interfere with the totalizing operation.

Figure 6:
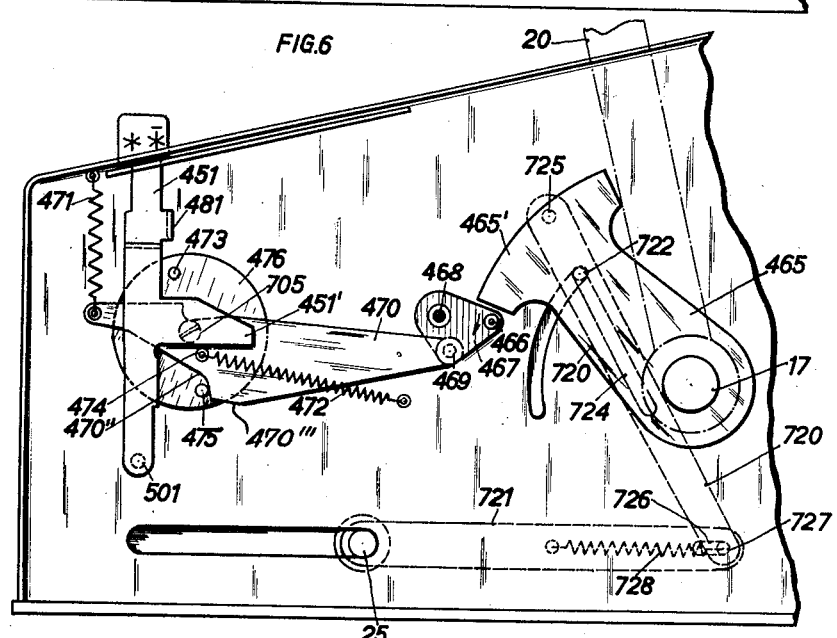
Fig. 6 is an elevation of a part of the front end of the machine showing the total key depressed.

If for example the total key 451 is depressed as in Figs. 5 and 6 its arm 451' acts on pin 474 of the coupling lever to force said lever downward against the tension of spring 471, so that shoulder 470' of the coupling lever 470 slides downward on pin 473 and releases said pin. As soon as that has occurred the spring 472 comes into action and this spring, aided by the operation of the pin 475 on the cam face 470''' at the under side of lever 470 causes the lever to move toward the rear of the machine. Spring 472 does not have to overcome the pull of spring 471 at this time, since finger 451' of the depressed total key 451 holds the lever 470 down and sustains the pressure of spring 471. As soon as pin 475 has passed the cam face 470''' the lever 470 falls due to the pressure of total key 457 and the pull of spring 472. Therefore when head 465' of the arm 465 fixed to the shaft 17 engages the roller 466 of the lever 467, the disc 476 is turned clockwise by the coupling member 470, and the said disc pulls the link 460 forwardly by its pin 475, thus rocking the adding mechanism 401 in one or the other direction. It will be observed that the arm 563 on the main shaft 17 is in engagement with the shoulder 562 on the lever 560 when the machine is in normal position and that as the handle 20 is pulled forward, the first operation of the machine is to reset the transfer mechanism. This occurs before the totalizers engage the racks under any condition of operations of the machine, whether it be adding, subtracting, or totalizing, so that the resetting of the transfer mechanism does not in any way interfere with the other operations of the machine.

In the minus position of the controlling lever 450 shown in Fig. 4, when taking a total to get a negative result, the slide 480 has been shifted to the right; i. e.; rearwardly, by means of the pin 479. The control lever 450 carries the pin 479. A spring 449 acts on lever 450, and said spring tends to shift said lever counter-clockwise so far as permitted by pin 479 in slot 480' of rail 480. Thus the spring 449 serves to maintain pin 479 constantly at the righthand end of slot 480' and to cause lever 450 to move to the right when the nose 450'' moves into a slot between teeth of control wheel 440. If now one of the keys 451 or 452 is depressed, the nose 481 or 482 thereof engages the bevelled face 483 or 491 of the rail 480 and shifts the same farther to the right and against the action of the spring 485, such movement being possible by reason of the slot 480' engaging the pin 479. By this movement of the rail 480 the bevelled face 486 provided at the bottom side thereof forces the pin 487 of the lever 488 downwardly, thus turning the said lever about its pivot bolt 489 anti-clockwise. The pin 463 fixed to the opposite end of the said lever is moved upwardly and it rocks the link 460 into the position in which the slot 460' engages the pin 462 of the rocker 458. If now by farther movement of the shaft 17 the link 460 is pulled forwardly, the cradle 401 is moved upwardly and into the minus position in which the subtraction gear wheels 404 are in mesh with the toothed segments 423.

If however the result is positive, the controlling lever 450 is in the plus position shown in Fig. 3, and the controlling rail 480 will have been shifted so far to the left that the nose 481 or 482 of the key 451 or 452 being depressed engages the bevelled faces 484 or 492. Thereby the rail 480 is shifted forwardly and to the left, and the lever 488 is not moved. Therefore the slide 460 remains in its lower position into which it has been moved by gravity and in which it acts on the pin 461 of the disc 458, so that the link 454 rocks the cradle into the lower or plus position.

When the minus key 453 is depressed a nose 453'' carried thereby engages the pin 487 of the lever 488 which is therefore likewise moved downwardly so that the slide 460 is rocked by the pin 463 into the position in which the slot 460' engages the pin 462 of the rocker 458 thus coupling the link 460 with the rocker 458.

According to the position of the controlling lever 450 the arm 453' of the minus key 453 being depressed cooperates with one or the other of the bevelled faces of the cut-out portion 700.

When the machine is in its idle position it is in position for transferring values from the keyboard to the algebraic register. As a result the rail 480 finds itself in the location indicated in Fig. 3. If the minus key is now depressed its shoulder 453' contacts with the inclined rearmost slope of cut-out 700 on rail 480.

If the machine is in the subtraction position, after completion of a throughgoing tens transfer accompanied by transfer of a fugitive one, whereby the register causes negative values to appear in the printing mechanism, the rail will be in the position shown in Fig. 4. Now if the minus key 453 be depressed its shoulder 453' will cooperate with the foremost slope of the cut-out 700 on the rail 480.

In both situations the shoulder 453' rests at the bottom of the cut-out 700 when the minus key is fully depressed. This sets the rail 480 and the pin 478 thereon in such a position as to locate the stepped arms 490 so as to cause a minus sign to be printed.

In the foregoing I have described how by the hand crank 20 the adding mechanism of cradle 401 is rocked into engagement with the toothed segments 423 and into the plus or minus position, according to the position of the controlling wheel 440, when a sum is taken and the total or subtotal key 451 or 452 is depressed. Upon further movement of the crank 20 the result is printed as a total or sub-total, and the parts are returned into their initial positions, as is known in the art and explained in Patent No. 1,986,137. When the result is printed different signs are printed according to the position of the controlling wheel 440, and after the total or sub-total key has been depressed and if the controlling wheel 440 is in the plus position, a positive total or sub-total sign is printed, but if the said controlling wheel 440 is in the minus position, a negative total or sub-total sign is printed.

For setting up the number 555 in the machine, previously cleared at positive zero, the five key in each of the units, tens and hundreds columns is first depressed, these keys being the fifth from the bottom in such rows of the keyboard shown in Fig. 1.

Upon depression of a five key its foot will be positioned in the path of movement of the slide 106' pertaining to that row of keys. This slide, which is biased to move in one direction by a spring 110 and which is held in its starting position by the cross rod 25 can move forward when the handle 20 is drawn forward, whereby the cross rod 25 is moved forward by means of the members 721, 720, 722 and 465, and is followed by slide 106'. The depressed five keys arrest the forwardly moving slides 106' short of their extreme forward position in a position corresponding to the "five" value. The type segments are connected to rails 106' by links 428 and arms 12'. By the partial advance of the slides corresponding to the actuated five keys the five types 126 are brought under type hammers, by actuation of which the number 555 is to be imprinted on the strip of paper passing over the rollers 13. Toothed segments 423 are connected to the type segments by springs 425, so that in setting up the number 555 on the type segments 12 toothed segments 423 corresponding to the number 555 are also adjusted.

It has been previously described what parts of the machine are moved in setting the five keys and in moving the handle 20 forward. It should be added that in the forward movement of the handle 20 the hammer-shaped lever 465, shown in Fig. 3 is moved downward, without however performing at this time any necessary function in the calculating operations. In so moving it forces the parts 466, 467 and 470 against the tension of spring 472, but after it has passed the roller 466 the spring returns these parts again to the position shown in Fig. 3.

Upon return movement of the crank 20 the following operations take place:

The hammer-shaped lever 465 now strikes its head 465' from below against the roller 466 and so draws the lever 470 backward, thus the pin 473 is moved clockwise through the action of the abutment 470' of lever 470, the disk 476 moving with the said pin. Due to the rotary movement of disk 476 the slide 460 is drawn forward by means of pin 475, so that its lower hook 460'', through pin 461, rocker 458, lever arm 456 and link 454 of the totalizer, is so moved with the gear sets 402 and 404 that the gear set 402 comes into engagement with the teeth of segments 423. This gear set serves for summation of the addition values that have been set up in the machine. After the hammer-shaped lever has moved past the roller 466 in the return movement of the crank 20 the spring 800 (Fig. 3) can draw the rail 460 back again into the position shown in Fig. 3. Thus the totalizer is again returned into the middle position shown in Fig. 3.

In the return movement of the handle 20 the cross rod 25 also returns to position. This cross rod carries the slides 106' back through the operation of springs 110, after the hammer-shaped lever 465' has located the totalizer with reference to the addition wheels 402. By reason of the connection of the link 428 and the arms 12' the type segments 12, and also the toothed segments 423 through spring 425, are returned to their original position, as shown in Fig. 1. In this return movement of the toothed segments 423 to their starting position the wheels 402 corresponding respectively to units, tens and hundreds are each rotated five spaces so that the number 555 is set up in the totalizer.

At the beginning of the return movement of the handle the type hammers shown in Fig. 1 enter into operation and strike down the types lying in front of them, with the result that the number 555 is printed on the paper strip extending about the rolls 13.

Shortly before the end of the return movement of the crank the depressed keys 90 are released, and thus the machine is left in its starting position of parts, which is shown in Figs. 1 to 3.

Now if 777 is to be subtracted from the number 555 set up in the totalizer, this number is first set up in the keyboard, and the minus key 453 is depressed. By actuation of this key 453 the spring 485 is tensioned through the operation of the finger 453' and the notch 700 as the rail 480 is drawn backward.

As the key 453 is depressed the finger 453'' strikes the lug 487 of the two-armed lever 488, whose fulcrum is at 489. Thereupon the free end of the lever 488 moves upward, raising the slide 460 through the action of lug 463 to a point where the upwardly opening hook 460' embraces the pin 462 on rocker 458.

Finally, during downward movement of the key 453 the rail 500 is moved rearwardly through the action of pin 503 on incline 504. Thereby the stepped lever 490 is swung on its pivot 494 so that through the medium of slide 509 a minus sign is printed simultaneously with the printing of the number 777, in the manner described herein.

As the handle 20 is drawn forward the same results follow as during the setting of the number 555 with the difference that the rail 460 now does not oscillate the totalizer in such manner that the gear set 402 engages the toothed segments, but rather as a result of the engagement of the upper hook 460' of the slide 460 with the pin 462 the gear set 404 is carried into engagement with the teeth of the segment 423, since the totalizer is now rocked in the direction of the minus arrow in Fig. 3.

Since the teeth of the members of the gear set 402 are in driving engagement with the teeth of corresponding members of the gear set 404 such members of set 402 will also be turned backward 777 units in the return movement of the crank 20. The tens transfer follows through in the manner described herein, since the pins noses 409 coact with the noses 413 of the tens transfer levers 411. This tens transfer following consecutively throughout the entire totalizer finally actuates the tooth 446 and through the shaft 447 also actuates the tooth 445. By means of the toothed segment 443'' the gear 439 is operated and through the five-toothed control wheel 440 a blank space comes into the position where formerly a tooth provided an abutment in the way of lever 450. The tensioned spring 485 therefore now draws the lever 450 into the minus position illustrated in Fig. 4. By reason of the entrance of the lever 450 into the blank space between teeth of the control wheel 440 the slide 480 has now been pulled back so far that upon depression of either of the totalizing keys 451, 452 their respective projections 481, 482 do not engage with the rearwardly extending inclines, but rather with the forward inclines 483, 491. Simultaneously, by reason of the rearward movement of the slide 480 carrying the pin 478 the spring-connected lever 491' has been so rocked ( with consequent rearward movement of the slide 500) that during the downward movement of either of the keys 451, 452 the inclines 499 and 506 will be engaged by pins 501, 502. Resultant to this, the stepped lever 490 is now in a position such that a minus sign will be printed.

The key 451 serves as a final totalizing key to determine the sum and simultaneously to bring the machine back to zero position, whereas the key 452 is a sub-total key which does not bring the machine to the zero position, but leaves the same in such position that the determined value can be used in further computations. Let it be assumed that the key 452 is now depressed. In the first portion of its working stroke the finger 482 of this key pushes the control slide 480 backward because the finger 482 acts against the incline 491. In the rearward movement of the slide 480 its underneath incline 486 acts on the lug 487 of the two-armed lever 488, which through its lug 463 again raises the lever 460, which in the operation of setting up the number 777 in the machine had returned to the starting position of Fig. 3 during the backward movement of the hand crank 20. Due to the raising of the lever 460 the totalizer will again be rotated in the direction of the minus arrow, in the manner described above, upon forward movement of the handle 20, so that the difference of —222 derived from the described operations is carried over into the toothed segments 423 and through these into the type-holding segments of the printing mechanism. The adjustment of the totalizer with respect to the minus gears 404 is rendered possible by means of the lever 450, which is now in the position of Fig. 4, since in this position of the lever the slide 480 has been forced so far rearwardly that the finger 482 on key 452 acts on the incline 491. The position of the nose 450" determines whether the result obtained in the totalizer shall be negative or positive. The positive position is shown in Fig. 3, the negative in Fig. 4.

It is immaterial to the operation of the machine whether one first adds and then subtracts or first subtracts and then adds. Thus, if the machine is clear and the problem is to first subtract 222 and then add 333 and take a total, the starting position for subtraction is as in Fig. 4. If now 222 be set up in the machine, and if the key 453 be simultaneously depressed the operation is exactly the same as in setting up the number —777. Of course the finger 453' of the minus key 453 strikes a different incline of the notch 700 in the minus position of the machine (Fig. 4) than in the plus position thereof (Fig. 3). The operation that occurs in either case is however the same, for with the machine in the plus position the slide 480 is farther forward, so that it is moved to the right by the action on the incline of notch 700, whereas in the minus position of the machine the slide 480 is drawn backward. The positions of the slide 480 attained by coaction of the inclines of the notch 700 with the finger 453' of key 453 is however the same in both cases. Now if the number 333 is added, the operation is precisely the same as in the setting up of the number 555 and in its printing. In introducing the number 333 into the totalizer there is again a tens transferring operation up to the highest value position, at which there is a passing over from the minus range of the totalizer into the plus range. Therefore, in manner as previously described, the five-toothed star wheel 440 is again turned and the lever 450 comes to bear against a tooth of this star wheel, as shown in Fig. 3. Engagement of the nose 450" of the lever 450 against the end of a tooth of the wheel is made possible by the fact that the rounded nose 450" of the lever is forced back by a tooth in the rotation of the wheel.

Now if after a throughgoing tens transfer operation the machine is in the position of Fig. 3, then to determine the sum and print the same the totalizer is rocked in the direction of the plus arrow in Fig. 3, and downward from the position there shown, and the difference (+111) is now printed. At this time the finger 482 of the sub-total key 452 acts on the incline 492 and draws the control slide forward so that the incline 486 cannot coact with the pin 487 to lift the slide. The lifting of the slide takes place only when the lever has the position relative to the wheel 440 that is shown in Fig. 4. The pin 502 on the sub-total key coacts with the incline 505, so that no minus sign is printed, but rather a small rhombus or a star is printed without any minus sign, indicating that the balance in the machine is positive.

The printing types for these signs are provided on an additional printing type segment which is connected with the setting slide 509 and which is located at the right of the units position of the mechanism, as is shown in Fig. 7 said slide having a nose 510 projecting through a slot 510' at the right of said figure. The printing mechanism is set into the position for plus and minus printing from the controlling wheel 440 through the intermediary of the controlling lever 450 and the rail 480. The pin 478 of the said rail engages the upwardly directed arm of the lever 491', the pivotal axis of which carries the stepped lever 490 which is yieldingly connected with the lever 491' by the spring 495.

According to the position of the rail 480 the lever 490 has two different initial positions. In the plus position of the machine the rail 480 has been shifted farther forwardly, and the free end of the stepped lever 490 is elevated relatively to its position when the mechanism is in the minus position. If none of the keys 451, 452, 453 has been depressed, that is when an addition is being made, at the beginning of the movement of the lever 20 the nose 510 of the setting slide 509 immediately engages the step $a$ of the lever 490, and no sign is printed. If however in the plus position of the controlling wheel 440 the total key 451 is depressed, the pin 501 thereof engages the bevelled face 498 of the setting rail 500, shifts the same rearwardly and elevates the lever 490 against the tension of the bifurcated spring 495, so far that the step $d$ is opposed to the nose 510. If thereafter the crank 20 is operated the nose 510 engages the said step $d$, and thereby the sign-type segment is turned so far that the positive total sign is printed.

In the minus position of the controlling wheel 440 the pin 501 of the total key 451 being depressed engages the bevelled face 499 and shifts the setting rail 500 forwardly. Thereby the stepped lever 490 is rocked downwardly, until its step $g$ is opposed to the nose 510. If thereafter the crank 20 is operated, the nose 510 engages the step g, and the negative total sign is printed.

The positioning of the rail 480 by the controlling lever 450 under the influence of the controlling wheel 440 causes the pin 478 to engage and position the lever 491' which through connected parts positions the setting rail 500. The minus position of the controlling wheel 440 is illustrated in Fig. 4 which shows the setting rail 500 moved sufficiently toward the front of the machine to cause the pin 501 on the total key 451 to engage the foremost bevel face 499 when the key 451 is depressed. The positive position of the controlling wheel 440 is shown in Fig. 3 and at this time, the setting rail 500 has been moved sufficiently toward the rear of the machine that the pin 501 on the total key 451 will engage the rearmost bevel face 498 when the total key is depressed.

When the sub-total key 452 is depressed with the controlling lever 450 in the plus position, the pin 502 of the said key engages the bevelled face 505, and the stepped lever 490 is elevated into the position in which the step e is opposed to the nose 510. Therefore the plus-subtotal sign is printed. But in the minus position the minus-subtotal sign is printed by the nose 510 engaging the step f.

When the minus key is depressed, it is immaterial whether the controlling wheel 440 is in the plus position or in the minus position. In both cases the pin 503 of the minus key 453 engages the bevelled face 504 of the setting rail, though at different parts of the said bevelled face, and it shifts the said setting rail in both cases rearwardly and into the same end position. The stepped lever 490 is elevated until its step b is opposite to the nose 510, so that the minus sign is printed. The step c of the lever 490 may be provided for setting when another key, for example a none-adding key, is depressed.

When the nose 450″ of the controlling lever 450 is located in a space between the spokes of the controlling wheel as illustrated in Fig. 4, and the rotating wheel is rotated through a one-half step, a spoke of the wheel engages the rounded end or nose 450″ camming the same outwardly against the spring 449 in such manner as to swing the control lever 450 clockwise, Fig. 4. However, when the rounded nose 450″ rests directly against the ends of one of the spokes of the control wheel 440, no camming action results. Since the nose 450″ of the lever 450 is either resting in the space between adjacent spokes or is positioned against the ends of one of the spokes, it will be observed that the relation between the nose 450″ of the lever 450 and the control wheel 440 does not disturb the operation of the machine.

In the construction described herein within the capacity of the machine, the correct total or sub-total sign is always printed without lost motion independently of the value of the number, by depressing of the total or sub-total keys so that it is possible to provide the sum key simultaneously with a plus total sign and a minus total sign and the sub-total key with a plus and a minus sub-total sign.

I claim:

1. In a device for taking positive and negative totals, an accumulator comprising a set of addition wheels and a set of subtraction wheels mounted on parallel axles, toothed members for driving said wheels, means through which a fugitive unit is transferred to the wheels of lowest order upon occurrence of an overdraft, means constructed to engage said accumulator with said toothed members either positively or negatively for the determination of a positive or a negative total, said fugitive unit means including an oscillatory member similar to said toothed members for driving the accumulator wheels, a pair of ten-toothed wheels, one of which is mounted on the axle of the addition wheels and the other on the axle of the subtraction wheels and which ten-toothed wheels are in engagement with said oscillatory member of the transferring means for the fugitive unit during the adjustment of the accumulator wheels in item entry, a five-toothed control wheel, that ten-toothed wheel which is located on the axle of the subtraction wheels being so connected with the five-toothed control wheel that upon each change in the character of total on the accumulator the control wheel is turned either in the positive or in the negative direction to bring the control wheel either into a position wherein the end of a tooth on said wheel coacts with an element of said engaging means to sense a positive value in the accumulator, or with a notch between two teeth to sense a negative value therein.

2. In a calculating machine, an accumulator comprising a set of addition wheels and a set of subtraction wheels, oscillatory toothed members for driving said wheels, means whereby a fugitive unit is transferred to the wheels of lowest order upon occurrence of an overdraft, means constructed to engage said accumulator either positively or negatively for the taking of a positive or a negative total, said fugitive unit means including an oscillatory member similar to said toothed driving members, a five-toothed control wheel mounted coaxially with said subtraction wheels, a pair of ten-toothed wheels mounted respectively coaxially with said addition and subtraction wheels and caused to engage said oscillatory member of the transferring means during adjustment of the accumulator in item entry, the ten-toothed wheel located coaxially with said subtraction wheels being so connected with said five-toothed control wheel that said five-toothed wheel is turned either to right or left upon each change from positive to negative total or vice versa, thereby bringing into position for coaction with an element of the accumulator engaging means either a tooth of the control wheel which signifies a positive value in the accumulator or a notch between successive teeth on said control wheel which notch signifies a negative value therein.

3. In a calculating machine adapted to perform adding and subtracting operations, the combination of a totalizer comprising a set of adding register wheels, a set of subtracting register wheels, the register wheels of one set being in complemental relation to the register wheels of the other set, actuating racks for operating said register wheels, a carrying rack located beyond the highest denominational order of actuating racks, a supplemental rack located below the units order of actuating racks, means to cause the carrying rack to move one tooth upon operation of the machine to subtract a larger number from a smaller number, means to cause the carrying rack to move the supplemental rack one tooth when the machine is so operated, and means controlled by the supplemental rack to cause a one tooth movement of the units actuating rack when the supplemental rack receives the said one tooth movement.

4. In a machine for performing adding and subtracting operations, the combination of a set of adding register wheels, a set of subtracting register wheels geared directly to said adding register wheels, the wheels of each set being in complemental relation to those of the other set, means to cause a one-tooth movement to the units register wheels when a larger amount is subtracted from a smaller amount, a control wheel operated by said means, said wheel having five spaced teeth, manipulative total control means, type positioning mechanism under control of said control wheel and said manipulative means for controlling selection of type designating the character of a total, and connections from said control wheel to said positioning mechanism including a lever having a nose engageable either with the end of a tooth of the control wheel or in a notch between successive teeth.

5. In a machine for performing adding and subtracting operations, the combination of a set of adding register wheels, a set of subtracting register wheels geared directly to said adding register wheels, the wheels of each set being in complemental relation to those of the other set, means to cause a one tooth movement to the units register wheels when a larger number is subtracted from a smaller number, a control wheel operated by said means, type selecting mechanism under control of said control wheel to select type designating the character of the results, a lever having a stepped portion to condition said type selecting mechanism, means controlled by said control wheel for initially setting said lever, and key-operated means whereby said lever may be given additional setting movements.

CHARLES W. NORTON.